A. Pruyn,
Hand Saw.
Nº 27,240.    Patented Feb. 21, 1860.
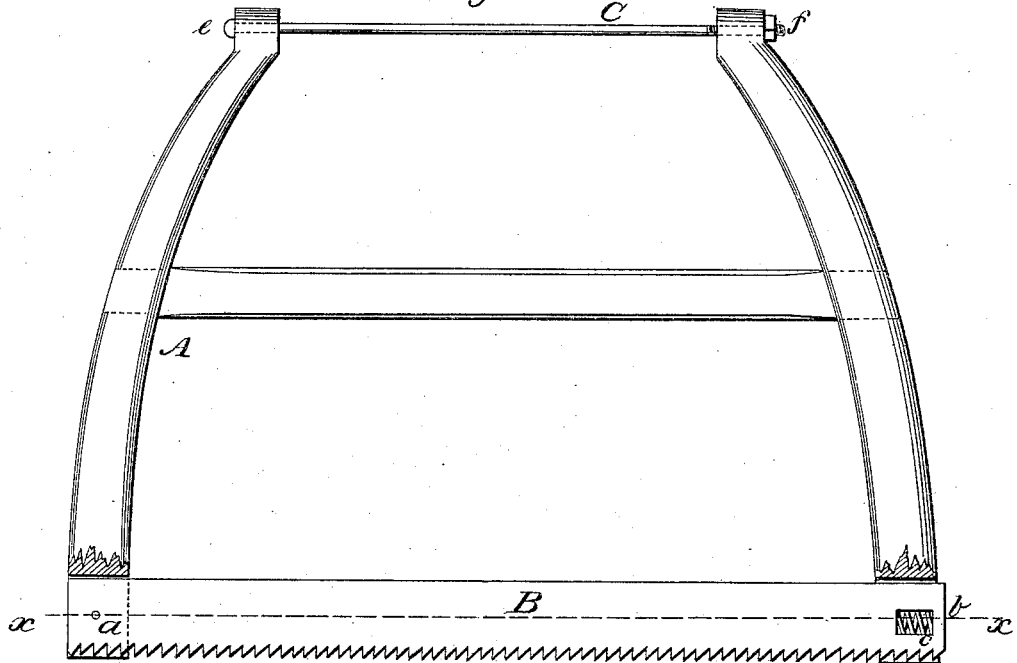
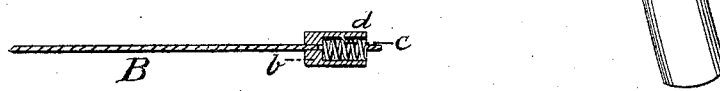
Witnesses
James Pettit
Henry C. Haskell
Inventor
A. Pruyn

UNITED STATES PATENT OFFICE.

AUGUSTUS PRUYN, OF ALBANY, NEW YORK.

DEVICE FOR ALLOWING FOR CONTRACTION OR EXPANSION OF BUCKSAW-BLADES.

Specification of Letters Patent No. 27,240, dated February 21, 1860.

*To all whom it may concern:*

Be it known that I, AUGUSTUS PRUYN, of Albany, in the county of Albany and State of New York, have invented a new and useful Improvement in Hand-Saws; and I do hereby declare that the following is a full, clear, and exact description of the same, reference being had to the annexed drawings, making a part of this specification, in which—

Figure 1, is a side view of a hand saw with my improvement applied to it. Fig. 2, is a section of ditto, taken in the line $x, x$, Fig. 1.

Similar letters of reference indicate corresponding parts in the two figures.

This invention relates to an improvement in that class of hand-saws which are formed of thin narrow steel plates or strips strained in frames such as those for sawing fire wood, frequently termed buck-saws, and also those used by joiners and others for sawing scroll or curved stuff.

The object of the invention is to obviate the difficulty hitherto attending the expansion of the saw consequent on the heating of the same by friction and also avoid the loosening or slackening of the saw produced by the spring of the frame. These objects are attained by the application of a spiral spring to the saw substantially as hereinafter described.

To enable those skilled in the art to fully understand and construct my invention I will proceed to describe it.

A represents a saw frame of the kind generally known as the buck saw for sawing fire wood, and B, is the saw strained therein by a screw rod C, at the upper end. The saw B, is constructed in the usual way, but it is secured in its frame A, in a novel way, as follows: One end of the saw is secured in the lower part of the frame by a pin $a$, the opposite end however is slotted as shown at $b$, and a spiral spring $c$, is fitted in the slot, as shown clearly in both figures.

The spiral spring $c$, is fitted within a hole or socket $d$, in the frame A, as shown more particularly in Fig. 2. This spring serves to retain the end of the saw within the frame A, and allows the saw to be strained in the frame under the action of the screw or straining rod C, the latter being provided with a head $e$, at one end and a nut $f$, at the other as shown clearly in Fig. 1.

From the above description it will be seen that the spring $c$, will admit of the saw B, expanding and at the same time will keep the saw perfectly strained not only under the expansion but also under any spring of the frame during the operation of sawing.

The invention though simple is an important one, for the saw will expand to a certain degree owing to the heat generated by friction and this expansion has hitherto detracted considerably from the efficiency of this class of implements. The frame A also always springs to some extent owing to the necessary power exerted against it in sawing and this springing of the frame also, in the ordinary saws, loosens the saw and renders it much less efficient than it would otherwise be. By my invention the spring $c$, applied as shown obviates these difficulties.

I do not claim broadly the application of springs to saws irrespective of the manner of application as herein shown and the class of saws to which the spring is applied; but, I do claim as new and desire to secure by Letters Patent:

The combination with the saw blade and saw frame of a spring ($c$), when the said spring is placed within a slotted opening in the blade and covered by the frame, as and for the purposes herein shown and described.

AUG. PRUYN.

Witnesses:
JAMES PETTIT,
HENRY C. HASKELL.